Patented Apr. 24, 1934

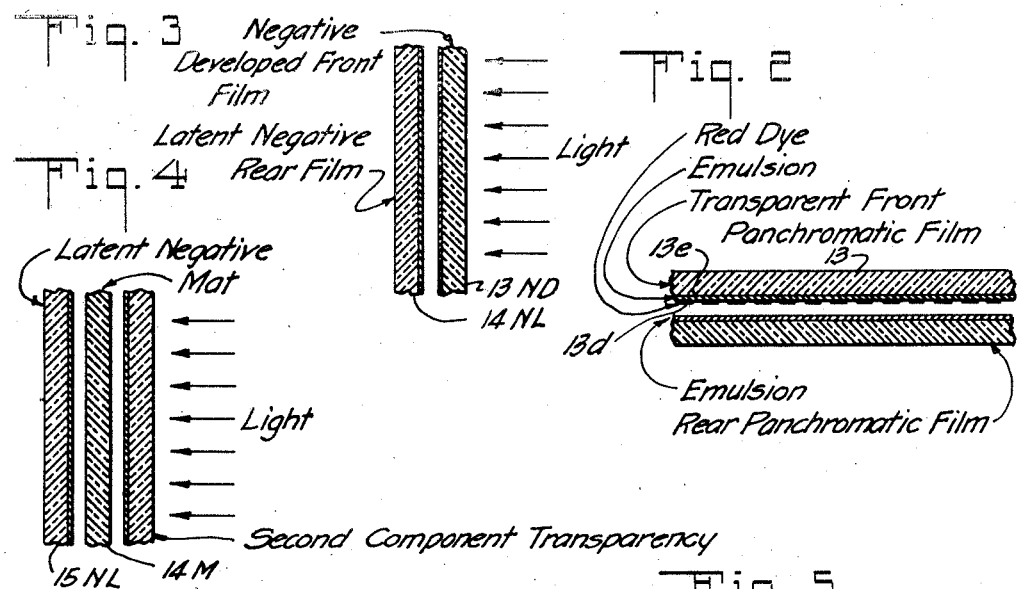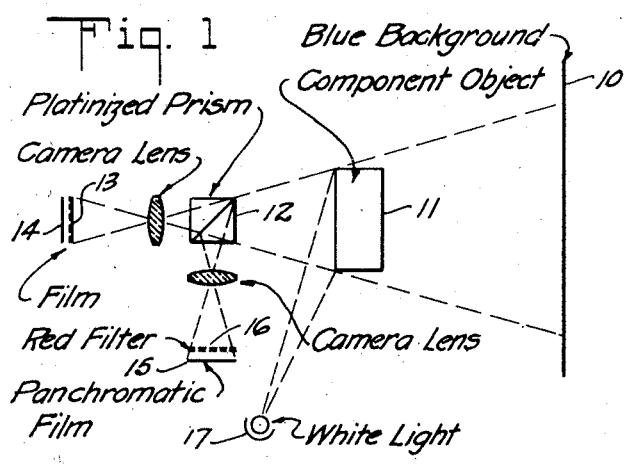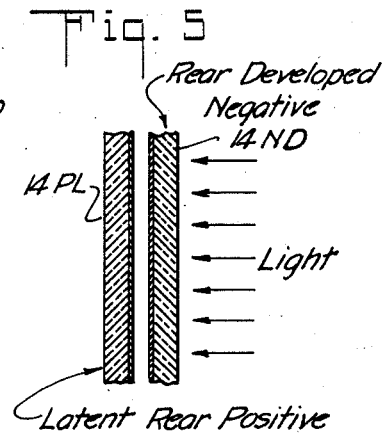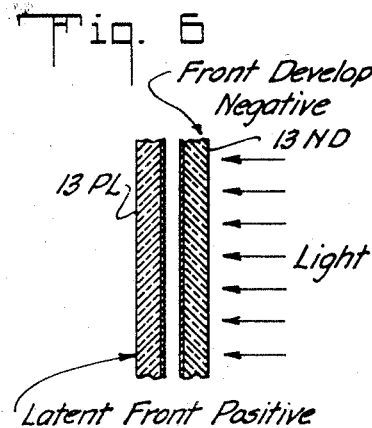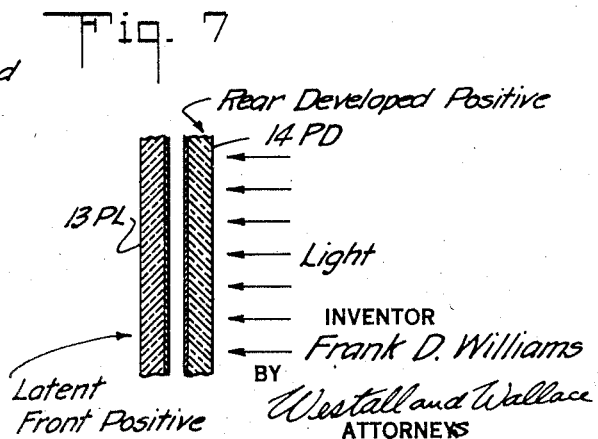

1,955,993

UNITED STATES PATENT OFFICE 1,955,993

PRODUCTION OF SILHOUETTES FOR COMPOSITE MOTION PICTURES

Frank D. Williams, Los Angeles, Calif.

Application November 3, 1931, Serial No. 572,810
Renewed September 18, 1933

5 Claims. (Cl. 88—16)

This invention relates broadly to a method of making mask films for use in composite motion picture photography. Mask films have heretofore been made of one component of a composite picture and a detail image of the complement to correspond therewith. Various methods have been employed for such work among which is one of simultaneously photographing on two films the component before a background non-actinic to both films. From one film a mask film is derived having a silhouette of the component and a clear background. This mask film is known in the art as a mat. A detailed image of the component with an opaque background is derived from the other film. Two methods have been used with limited success for making matched images on two films to be employed as above set forth. One includes photographing on two films by use of a platinized prism which splits the light rays, and the other by placing one film over another to produce what is known as a "bipack," the front film being transparent. If a black background is used and the component is an actor dressed in any garments which are black, those garments will merge with the background and only a portion of the actor will be obtained as a silhouette, so that the silhouette will not truly outline the actor and does not form a usable mat.

Another method proposed and used with limited success comprises photographing on two films to produce matched images of a component; one of the films being non-actinic with relation to the background and actinic with relation to the component for production of a detail image with a clear background, the other film being actinic to the background and light of a color other than that of the background being subtracted by a filter medium for production of a stencil, that is, a film having an opaque background and an image which is clear and substantially non-detailed. A silhouette in black on a clear background may be made from the stencil and used as a mat. A species of the last-mentioned method consists in photographing an actor before a red background, the actor having divers colors; the film used to produce the detail image being orthochromatic; the film used to produce the stencil being shielded by a red color filter and the last-mentioned film may be panchromatic or infra red, that is, actinic to red light. If the actor is dressed in any garments which are red, those garments will merge with the background and only a portion of the actor will be obtained as a stencil and the derived silhouette will not be an outline of the actor. In the last-mentioned method and its species, the detail image film as photographed has a latent negative of the image with a latent clear background. This original latent negative may be used to print in or photograph the other component on the latent clear background. Printing a positive from a negative and then a negative from a positive so as to produce a second negative is known in the art as "duping," and the second negative is known as a "dupe." Also a second positive derived from a first positive by printing is known as a "dupe." Due to increasing the grain effect by multiple printing, dupes are not the equals of the original negatives. The last-mentioned method and its species avoids the use of dupes for the production of the negative of the detail component.

The primary object of this invention is to make a composite picture wherein a negative of a component is originally obtained in photographing and directly used to receive a print or photograph of the other component, thereby avoiding use of dupes; and to make a mat for use in composite printing by employing two films, one being actinically affected by the background of the component and the other being actinically affected by the color subtractive of the background color whereby parts of the component may be the same color as the background and yet a clear outline silhouette obtained.

As illustrative of the method, the accompanying drawing indicates schematically the steps. In the drawing, Fig. 1 is a diagrammatic view showing means for photographing using a platinized prism employing a bipack and a third film for use as an original detail negative upon which the other component may be photographed or printed; Fig. 2 is a sectional view through two films in bipack relation; Fig. 3 shows production of a mat film from the bipack films; Fig. 4 shows the production of a composite picture on the third film; and Figs. 5, 6, and 7 illustrate a variation in the method of making a latent mat for development.

Referring more particularly to Fig. 1, a component object 11 is placed before a highly lighted blue background 10. The camera by which photographing is effected includes a platinized prism 12 which splits the light by passing some to a bipack of panchromatic films 13 and 14 for impressing images thereon. Light is reflected from the platinized surface and directed upon a panchromatic film 15 having a red color filter 16. The front film 13 should be as near transparent as possible, its emulsion 13e being covered by a red dye 13d which serves as a filter for red light. The rear film 14 is an ordinary panchromatic film but preferably of contrasty stock, that is, one having a surface which brings out great contrast between light and shadow. The bipack films are placed one over the other with their emulsions face to face and in contact. In Fig. 2 the films are not shown in contact, but in their relative positions in order to avoid confusion in the drawing. The component object 11 may carry colors of various hues and is shown illuminated by a white light 17. The background may also be illuminated by this light or by blue light. The object 11 may be an animate object, such as an actor, and will be hereafter referred to as the actor component.

The background is highly illuminated as compared with the object and an exposure is made. Obviously, the film 13 will receive a light impression in detail of the actor component and the background will actinically affect the emulsion. The red dye serving as a filter does not pass the light from the background but passes the red component of the light from the actor to the film 14. The film 15 is light impressed similarly to the film 14 due to the red filter 16. The film 13 is developed, the red dye having been removed from the film 13. The developed film 13 shows the details of the actor in negative with the background opaque. The films 14 and 15, if developed would, show a clear background and only red components of the actor in negative. Instead of a panchromatic film 13 with a red dye, a clear panchromatic film may be used and the film 14 may be an infra red film which is substantially only sensitive to red, or a transparent red filter film may be placed between the films 13 and 14 as a substitute for the red dye.

Referring to Figs. 3 and 4, the film 13 is cleared of the red dye and developed to produce the film denoted 13ND. The undeveloped negative film 14 is indicated by 14NL. Film 13ND is used as a transparency to light print upon film 14NL. The film 13ND shows the details of the actor in negative with an opaque background. The developed front film object image is opaque at the high light areas but to a less degree than the background image and has degrees of translucency at the shadows in reverse proportion to the depth of shadow. Due to overlighting the background, no part of object 11 will produce as high a degree of exposure on film 13 as that due to the background. The rear film has a background which is not light impressed and red components in negative of the actor. By printing upon film 14NL through film 13ND, there is an additive action of the actor image details, producing on film 14NL a latent silhouette on a latent clear background. This film is then developed to produce the mat film 14M.

As shown in Fig. 4, a positive transparency of the other component is used to print upon the undeveloped negative 15 marked 15NL. The mat 14M is interposed between the films to shield the light impression of the actor component on film 15NL. The film 15NL upon development produces a composite negative. Although for simplicity contact printing is employed, it is obvious that the second component may be photographed on film 15NL shielded by mat 14M or a printer may be used.

Referring to Figs. 5, 6, and 7, the mat film may be made as follows: the films 13 and 14 are developed, the red dye having been removed from the film 13 by any of the well-known methods so that a detail negative is provided with an opaque background from the film 13. The film 14 has a partial negative of the actor and a clear background. The developed negative film indicated by 14ND is used to print a latent positive indicated by 14PL in Fig. 5, and this latent positive is developed. The developed negative 13 indicated by 13ND in Fig. 6 is used to print a latent positive indicated by 13PL. The developed positive of the film 14PL indicated by 14PD in Fig. 7, is placed over the undeveloped film 13PL, and a further print made producing a latent silhouette upon a latent clear background which is developed to produce a mat film which may be used in conjunction with undeveloped film 15 to produce a composite picture.

The print 14PL is preferably made on contrasty stock, that is, a film having a sensitized surface which brings out a great contrast between light and shadow. In the development of the film 14PL it is preferable that the developer used be one which brings out contrast and if advisable the film 14PL may be intensified after its development. The film 14PD shows positive red details of the actor and an opaque background. The film 13PL will have latent positive details of the actor and a latent clear background.

What I claim is:

1. In the art of composite photography wherein a component object is photographed before a monochromatic background, the background being more highly illuminated than the object, the method of producing a mat having a silhouette image of the object with a clear background and an initial film for a composite picture having a latent detail image of said object matching the silhouette image and with a latent clear background; photographing by camera apparatus the component object in matched relation on three films by light transmitted from the object and background, one of said films being panchromatically light impressed; the other films being impressed by light subtractive of the color of said background and forming a pair of like films; reserving one of said pair as a latent final component film for a composite picture and utilizing the other of said pair to provide a mat constituent film; deriving from the panchromatically light impressed film a transparency having an opaque background and an image of the component which would by light transmission therethrough and impression on the mat constituent film additively produce film with a latent clear background and a latent silhouette of the component; and light impressing through said transparency the mat constituent film and developing it to produce a mat silhouette film.

2. In the art of composite photography wherein a component object is photographed before a monochromatic background, the background being more highly illuminated than the object, the method of producing a mat having a silhouette image of the object with a clear background and an initial film for a composite picture having a latent detail image of said object matching the silhouette image and with a latent clear background; photographing by camera apparatus the component object in matched relation on three films by light transmitted from the object and background, two of said films being in bipack relation and the front film of the bipack being panchromatically light impressed; the other film and the rear film of the bipack being impressed by light subtractive of the color of said background and forming a pair of like films; reserving one of said pair as a latent final component film for a composite picture and utilizing the other of said pair to provide a mat constituent film; deriving from the panchromatically light impressed film a transparency having an opaque background and an image of the component which would by light transmission therethrough and impression on the mat constituent film additively produce a film with a latent clear background and a latent silhouette of the component; and light impressing through said transparency the mat constituent film and developing it to produce a mat silhouette film.

3. In the art of composite photography wherein a component object is photographed before a monochromatic background, the background being more highly illuminated than the object, the method of producing a mat having a silhouette image of the object with a clear background and an initial film for a composite picture having a latent detail image of said object matching the silhouette image and with a latent clear background; photographing by camera apparatus the component object in matched relation on three films by light transmitted from the object and background, one of said film being panchromatically light impressed; subtracting light of the color of said background from the other films and forming a pair of like light impressed films; reserving one of said pair as a latent final component film for a composite picture and utilizing the other of said pair to provide a mat constituent film; deriving from the panchromatically light impressed film a transparency having an opaque background and an image of the component which would by light transmission therethrough and impression on the mat constituent film additively produce a film with a latent clear background and a latent silhouette of the component; and light impressing through said transparency the mat constituent film and developing it to produce a mat silhouette film.

4. In the art of composite photography wherein a component object is photographed before a monochromatic background, the background being more highly illuminated than the object, the method of producing a mat having a silhouette image of the object with a clear background and an initial film for a composite picture having a latent detail image of said object matching the silhouette image and with a latent clear background; photographing by camera apparatus the component object in matched relation on three films by light transmitted from the object and background, two of said films being in bipack relation and the front film of the bipack being panchromatically light impressed; subtracting light of the color of said background from the other film and the rear film of the bipack and forming a pair of like films; reserving one of said pair as a latent final component film for a composite picture and utilizing the other of said pair to provide a mat constituent film; deriving from the panchromatically light impressed film a transparency having an opaque background and an image of the component which would by light transmission therethrough and impression on the mat constituent film additively produce a film with a latent clear background and a latent silhouette of the component; and light impressing through said transparency the mat constituent film and developing it to produce a mat silhouette film.

5. In the art of composite photography wherein a component object is photographed before a monochromatic background, the background being more highly illuminated than the object, the method of producing a mat having a silhouette image of the object with a clear background and an initial film for a composite picture having a latent detail image of said object matching the silhouette image and with a latent clear background; photographing by camera apparatus the component object in matched relation on three films by light transmitted from the object and background, one of said films being panchromatically light impressed; transmitting light from said object and background to the other films through color filters subtractive of the color of said background to form a pair of like light impressed films; reserving one of said pair as a latent final component film for a composite picture and utilizing the other of said pair to provide a mat constituent film; deriving from the panchromatically light impressed film a transparency having an opaque background and an image of the component which would by light transmission therethrough and impression on the mat constituent film additively produce a film with a latent clear background and a latent silhouette; and light impressing through said transparency the mat constituent film and developing it to produce a mat silhouette film.

FRANK D. WILLIAMS.